United States Patent
Ogle et al.

(10) Patent No.: US 7,678,719 B2
(45) Date of Patent: Mar. 16, 2010

(54) METHOD FOR FORMING BI-LAYERED FIBER AND FOAM CARPET UNDERLAY

(75) Inventors: Steven Eugene Ogle, Cary, NC (US); Karl Lee Van Becelaere, Nashville, TN (US)

(73) Assignee: L&P Property Management Company, South Gate, CA (US)

( * ) Notice: Subject to any disclaimer, the term of this patent is extended or adjusted under 35 U.S.C. 154(b) by 0 days.

(21) Appl. No.: 11/858,691

(22) Filed: Sep. 20, 2007

(65) Prior Publication Data

US 2008/0008862 A1    Jan. 10, 2008

Related U.S. Application Data

(63) Continuation of application No. 10/061,845, filed on Jan. 30, 2002, now Pat. No. 7,279,065.

(60) Provisional application No. 60/265,003, filed on Jan. 30, 2001.

(51) Int. Cl.
*B32B 5/18* (2006.01)
*D04H 1/00* (2006.01)
*B32B 27/12* (2006.01)

(52) U.S. Cl. .................. 442/370; 442/338; 442/352; 442/394; 442/402; 442/409; 442/415; 442/416; 428/159; 428/218; 428/219; 428/220

(58) Field of Classification Search .............. 442/370, 442/338, 352, 394, 402, 409, 416, 415; 428/159, 428/219, 220, 218
See application file for complete search history.

(56) References Cited

U.S. PATENT DOCUMENTS

| | | | | |
|---|---|---|---|---|
| 4,037,013 A | * | 7/1977 | Sprague | 428/304.4 |
| 4,129,675 A | * | 12/1978 | Scott | 442/338 |
| 4,474,846 A | * | 10/1984 | Doerer et al. | 442/415 |
| 5,023,131 A | * | 6/1991 | Kwok | 442/416 |
| 5,045,389 A | * | 9/1991 | Campagna | 428/316.6 |
| 5,082,705 A | | 1/1992 | Rose | |
| 5,116,439 A | | 5/1992 | Raus | |
| 5,804,005 A | | 9/1998 | Buck | |
| 6,039,821 A | * | 3/2000 | Buck | 156/62.2 |
| 6,189,279 B1 | | 2/2001 | Fiechtl | |
| 6,253,526 B1 | | 7/2001 | Murphy et al. | |
| 6,440,341 B1 | * | 8/2002 | Mussallem, III | 264/80 |
| 6,506,695 B2 | | 1/2003 | Gardner et al. | |
| 6,576,577 B1 | | 6/2003 | Garner | |
| 7,279,058 B2 | | 10/2007 | Morgan | |

(Continued)

*Primary Examiner*—Norca L Torres-Velazquez
(74) *Attorney, Agent, or Firm*—Conley Rose, P.C.; Kristin Jordan Harkins (57) ABSTRACT

The present invention relates to a method for forming a bi-layered carpet underlay. More particularly, the method includes bonding a layer of non-woven fibers and a layer of re-bonded foam particles together to form the bi-layered carpet underlay. The layers of the carpet underlay can be bonded together with the use of adhesives, by heating a surface of one or both layers to a soft bondable state for lamination between the layers, by applying a film having adhesive surfaces between the layers, or by other suitable bonding means. The bi-layered carpet underlay combines the soft cushioning resilience of foam with the high durability bridging ability of fiber to provide a carpet underlay that maintains its height or thickness and firmness, while imparting softness and cushioning effects over an extended period of wear.

16 Claims, 5 Drawing Sheets

U.S. PATENT DOCUMENTS

2003/0124937 A1 * 7/2003 Williams et al. ............ 442/327
2005/0069694 A1   3/2005 Gilder et al.
2006/0106124 A1   5/2006 Fink et al.

* cited by examiner

METHOD FOR FORMING BI-LAYERED FIBER AND FOAM CARPET UNDERLAY

CROSS-REFERENCE TO RELATED APPLICATIONS

This application is a continuation under 35 U.S.C §120 of and claims priority to co-pending U.S. patent application Ser. No. 10/061,845 filed Jan. 30, 2002 and entitled "Method for Forming Bi-layered Fiber and Foam Carpet Underlay", which claims the benefit under 35 U.S.C. §119(e) of Provisional U.S. Patent Application Ser. No. 60/265,003, entitled "Bi-layered Fiber/Foam Carpet Underlay and Method" filed on Jan. 30, 2001, both hereby incorporated herein by reference for all purposes. Accordingly, priority is claimed back to the above-listed patents and applications.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to a method for forming a bi-layered carpet underlay. More particularly, the method includes providing a layer of non-woven fibers and a layer of re-bonded foam particles and disposing the layers together to form the carpet underlay. The layers of the carpet underlay can be bonded together with the use of adhesives, by heating a surface of one or both layers to a soft bondable state for lamination between the layers, by applying an adhesive film between the layers, or by other suitable bonding means. The bi-layered carpet underlay combines the soft cushioning resilience of foam with the high durability bridging ability of fiber to provide a carpet underlay that maintains its height or thickness and firmness, while imparting softness and cushioning effects over an extended period of wear.

BACKGROUND OF THE INVENTION

Carpet underlays are installed between the subfloor and the carpet in a flooring system to impart support to the carpet thus improving the stability and increase the life of the carpet. In addition, carpet underlays can improve the softness and cushioning features of the carpet for the comfort of a user. Single layer carpet underlays are traditionally used for both residential and commercial applications. Carpet underlay for residential use is typically a foam pad. The pad is constructed of recycled foam which has been shredded into particles, the particles then formed into a pad and bonded together to form the carpet underlay. While the foam pad is soft, cushioning and resilient, durability aging tests show that over a period of wear the foam loses its resilience and disintegrates, causing the foam to take on a yellowish tint. The bond between the foam particles may also disintegrate, resulting in a carpet underlay which is hard, flat and which may eventually decompose. As a result, in high traffic areas such as in hotels and other commercial applications, fiber pads are traditionally used as single layer carpet underlays. Fiber pads are firmer than foam pads and maintain roughly their original height throughout their life. Fiber pads are also effective bridging materials which provide reinforcement and distribute stress across the carpet to extend the wear life of the carpet. While fiber pads are more durable than foam pads, they are not as soft, cushioning or resilient.

Multi-layer pads are also used as carpet underlays. These underlays typically include a combination of one or more layers of polymetric foam, liner sheets of polyethylene film and re-bonded foam padding. For example, a layer of polyurethane foam is layered between and bonded to a liner sheet of low density polyethylene and a preformed padding material of polyurethane foam or re-bonded foam. Another multi-layered foam underlay comprises a combination liner sheet of polyethylene, one or more polyurethane foam layers and a second polyethylene liner sheet. Other combinations comprise a layer of polyethylene, an intermediate layer of polyurethane foam and a base layer of re-bonded foam.

Conventional processes for making multi-layer carpet underlays include feeding a polyethylene liner sheet onto a conveyor belt and spraying uncured polyurethane foam onto the liner sheet. Preformed foam padding is applied to the uncured polyurethane foam. The composite pad is fed between a pair of heated conveyor belts to cure the polyurethane foam and to adhere the foam to the liner sheet and the foam padding. In another process, a polyethylene liner sheet having a previously cured layer of polyurethane foam material is fed onto a conveyor belt. Uncured polyurethane foam is sprayed onto the cured polyurethane foam layer. Another polyethylene liner sheet is applied to the uncured polyurethane foam to sandwich the cured and uncured polyurethane foam layers between the polyethylene liner sheets. The composite is fed between a pair of heated conveyor belts to cure the polyurethane foam and to adhere the foam to the liner sheets and the previously cured polyurethane foam layer. In a further process for making a multi-layer carpet underlay a first polyethylene liner sheet is fed onto a conveyor belt and uncured polyurethane foam is sprayed onto the polyethylene sheet. A second polyethylene liner sheet is applied to the uncured polyurethane foam. The composite pad is fed between a pair of heated conveyor belts to cure the polyurethane foam and to adhere the foam to the first and second liner sheets.

SUMMARY OF THE INVENTION

Through significant time and effort, a new method for forming an improved carpet underlay has been found. As will be appreciated by one skilled in the art, the novel method of the present invention combines the soft cushioning resilience of foam with the high durability bridging ability of fiber to provide a carpet underlay that maintains its height while imparting softness and cushioning effects over an extended period of wear.

The method of the present invention comprises providing a layer of non-woven fibers and a layer of re-bonded foam particles. The fiber layer and the foam layer are bonded together to form the carpet underlay. Bonding of the layers can be accomplished by applying a cold adhesive binder material to a surface of the fiber layer or to a surface of the foam layer and disposing the surfaces together to form the bond between the fiber layer and the foam layer. Alternatively, a heat activated binder material could be applied to either surface, the surfaces of the layers being disposed together and heat applied to the composite material at a temperature sufficient to cure the binder material. In addition, heat could be applied to a surface of the fiber layer or to a surface of the foam layer at a temperature sufficient to soften the surface. The fiber layer and the foam layer surfaces would be disposed together and the softened surface cooled to fuse the layers together. The fiber layer and foam layer could also be bonded together by placing between the layers a film having an adhesive applied to its surfaces for bonding to the layers. Use of a film adhesive to bond the fiber layer and the foam layer together in a carpet underlay would have as additional advantage of preventing the migration of liquid from the subfloor to the carpet or from the carpet to the subfloor.

In a carpet underlay of the present invention, the non-woven fiber layer comprises the top layer of the carpet underlay which would be proximate a decorative carpet in a flooring system. The bottom layer of the carpet underlay is the re-bonded foam layer which is proximate the subfloor in a flooring system. As a result, in a carpet underlay having a film adhesive between the foam layer and the fiber layer, the film can prevent liquid from migrating from the subfloor to the carpet or from the carpet to the re-bonded foam pad layer, thus protecting the carpet or the re-bonded foam from moisture.

The thickness of the bi-layered carpet underlay can be of any dimension suitable for the desired application and can be adjusted by varying the thicknesses of the non-woven fiber layer and the foam layer. For example, the thickness of the carpet underlay can range from about ½ inch to 1 inch and can be provided with a combination of various thicknesses for the foam layer and the non-woven fiber layer. The foregoing is provided as an example only and not as a limitation to the present invention.

The fiber layer of the carpet underlay is formed by blending carrier fibers which have a relatively high melting temperature with binder fibers which have a relatively low melting temperature to provide a substantially homogeneous blend. The homogeneous blend can be any of a number of suitable blends and as an example, the binder fiber can be anywhere in the range of about 5 percent to 50 percent by volume of the blend.

The blended fibers are formed into a batt by using a garnett machine, cross layers, an air layer or any other suitable batt forming apparatus. In a garnett and cross laying process, the blend of fibers is formed into a web for transporting along a conveyor moving in the machine direction. Successive web layers are layered in the cross direction onto the conveyor in an progressive overlapping relationship by moving one or more reciprocating cross-lappers carrying the web back and forth between a first side of the conveyor and an opposing second side.

The batt is positioned on an air permeable support and a vacuum is applied through the air permeable support and batt from a first side of the batt to an opposing second side of the batt. The vacuum pressure is sufficient to substantially compress the web into a desired thickness or loft and at a desired density. In an alternative embodiment, the batt is compressed between opposing counter rotating rollers which are spaced apart a predetermined distance to reduce the thickness and increase the density of the batt. Heat is applied to the web structure at a temperature sufficient to soften the binder fibers but low enough to avoid melting the other fibers of the blend. The plastic memory of the softened binder fibers is released in their compressed configuration and the fibers fuse to themselves and to the other web fibers to form a batt having interconnected and fused fibers. The batt is cooled in its compressed state to reset the plastic memory of the binder fibers and form a thermal bonded batt having a density and thickness substantially the same as induced in the batt by the vacuum pressure or compression.

The fiber layer of the carpet underlay can also be comprised of carrier fibers which are bonded using resin rather than low melt binder fibers. In this embodiment, carrier fibers are blended into a homogeneous mixture. The blended fibers can be formed into a web generally according to the garnett method for forming the thermally bonded web described herein. An air laying machine can also be used. Generally, the fibers are introduced into an air stream which carries the fibers to an air permeable support such as a perforated drum which is rotating. Accumulation of the fibers onto the drum surface results in a web formation. A vacuum is applied through the web from one side of the web to the other and through said air permeable support sufficient to reduce the thickness and increase the density of the web throughout the thickness of the web to form a batt. The batt is saturated with a heat curable resin. Heat is applied at a temperature sufficient to cure the resin and fuse the fibers to form a batt having a density and thickness substantially the same as during the heating step.

While heat and resin bonding methods are discussed, other methods for bonding the non-woven fibers to form the fiber layer of the carpet underlay are suitable, such as for example, needle punching, hydro-entangling and mechanical bonding, and are within in the scope of the present invention.

The foam layer of the carpet underlay is formed by shredding recycled foam into particles. The shredded foam particles are blended into a homogeneous mixture and a chemical resin is mixed into the homogenous blend. The blended foam particles and resin are compressed and extruded into a block or blown into a cylindrical log mold. Steam is applied to the compressed block or log and the water and heat initiate a chemical reaction in the resin. The compressed block or log dries and the resin cured. The compressed block or log is then sliced along its height to create foam layers having thicknesses corresponding to the sliced heights.

The invention is more particularly shown and described in the accompanying drawings and materials included herein.

BRIEF DESCRIPTION OF THE DRAWINGS

For a more complete understanding of the present invention, and for further details and advantages thereof, reference is now made to the following Detailed Description of the Drawings taken in conjunction with the accompanying drawings, in which.

DETAILED DESCRIPTION OF THE INVENTION

Figure 1:
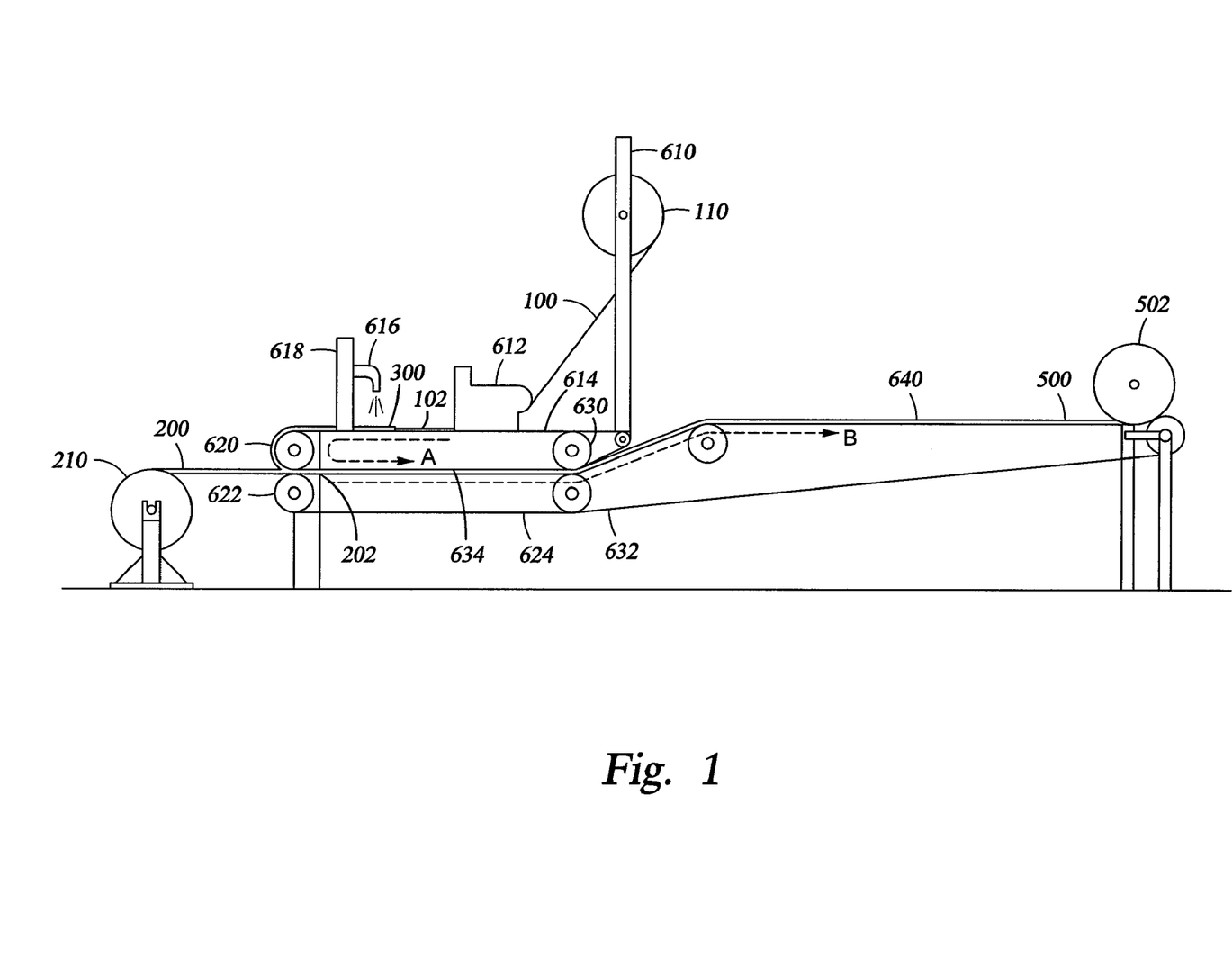
FIG. 1 provides a schematic side view of a process for producing a bi-layered carpet underlay.

The method for forming a bi-layered carpet underlay comprises providing a layer of non-woven fibers and a layer of re-bonded foam particles and bonding the layers together. The method is illustrated in FIG. 1. In general, an adhesive 300 is sprayed onto a surface 102 of a continuous layer of non-woven fiber 100. While the schematic in FIG. 1 illustrates adhesive 300 being applied to surface 102 of non-woven fiber layer 100, adhesive 300 could also be applied to surface 202 of foam layer 200. The surface 102 of the non-woven fiber layer 100 contacts the surface 202 of the foam layer 200 to form the bi-layered carpet underlay 500 which is compressed to bond the non-woven fiber layer and foam layer together. For heat activated adhesives, the bi-layered carpet underlay 500 is heated to a temperature sufficient to cause the adhesive 300 to react and cure to form the bond between the non-woven fiber layer 100 and the foam layer 200. For cold adhesives, bonding of surface 102 of fiber layer 100 with surface 202 of foam layer 200 occurs upon contact.

More particularly, the process of forming a bi-layered carpet cushion 500 is accomplished by feeding a leading edge (not shown) of the non-woven fiber layer 100 from a supply roll 110 mounted on a traverse station 610 through a rotatable drum 612 onto a surface of conveyor belt 614. Non-woven fiber layer 100 is transported generally along conveyor path A defined by conveyor belt 614. Conveyor belt 614 can be a chain link belt or other belt configurations known by one skilled in the art, which are within the scope of the present invention. Conveyor belt 614 is operated at any suitable line speed, for example, in the range of about 14 to 20 feet per minute, but the line speed can vary as desired.

A composition of adhesive is mixed, metered and applied to non-woven fiber layer 100 by one or more spray units 616 attached to a traverse 618 which reciprocates along a traverse direction to form a substantially uniform distribution of adhesive 300 to fiber surface 102. The reciprocation speed and travel of traverse 618, the distance between traverse 618 and conveyor belt 614 and the number and spacing of spray units 616 can be adjusted to achieve the desired spray pattern and amount of adhesive 300 onto surface 102 of fiber layer 100.

The leading edge (not shown) of the fiber layer 100 having an application of adhesive 300 travels along conveyor path A and is fed through a pair of counter rotating drums 620, 622. A leading edge (not shown) of foam layer 200 is fed from a supply roll 210 through the pair of counter rotating drums 620, 622 onto conveyor belt 624 which transports foam layer 200 generally along conveyor path B defined by conveyor belt 624. Surface 102 of fiber layer 100 containing adhesive 300 contacts surface 202 of foam layer 200 to form the bi-layered carpet underlay 500. Foam layer 200 is transported by conveyor belt 624 preferably in substantially alignment with fiber layer 100 as it is transported by conveyor belt 614. The leading edges of fiber and foam layers 100, 200 are preferably substantially aligned to minimize material waste.

Conveyor belts 614, 624 are operated at substantially the same speed, and between counter rotating drums 620, 622 and 630, 632 define double belt conveyor 634. Double belt conveyor 634 can be heated along a section for applications where heat activated adhesives are used as the bonding material between the fiber layer 100 and the foam layer 200. The distance between conveyor belts 614, 624 of double belt conveyor 634 is adjustable so that the bi-layered carpet underlay 500 is compressed, preferably along the heated section, to a desired thickness. The adjustment can be accomplished by varying the distance between upper drums 620, 630 and lower drums 622, 632. The length of double belt conveyor 634 between counter rotating drums 620, 622 and 630, 632 can be any suitable dimension. For example, the length can be in the range of about 30 to 40 feet.

Compression of bi-layered carpet underlay 500 also minimizes air pockets or gaps between the layers. As the fiber and foam layers 100, 200 of the carpet underlay move through the heated and compression section of double belt conveyor 634, the heat accelerates reaction of the adhesive mixture to form and to cure adhesive 300 thereby creating a bond between surfaces 102, 202 of the fiber and foam layers 100, 200.

Bi-layered carpet underlay 500 is carried along conveyor path B of conveyor belt 624 onto run out table 640 and through a trimming station (not shown) where the bi-layered carpet underlay 500 is trimmed to a desired width and cut to a desired length. Bi-layered carpet underlay 500 can be rolled onto a windup spool 502 for packaging.

In addition to the use of adhesives, other methods of bonding fiber layer 100 and foam layer 200 to form bi-layered composite cushion 500 are also suitable. Heat could be applied to surface 102 of fiber layer 100 or to surface 202 of foam layer 200 at a temperature sufficient to soften the surface. For example, a heater (not shown) could be attached to traverse 618 to heat and soften surface 102 of fiber layer 100 as the layer is transported along conveyor path A. Alternatively, a heater could be attached to a traverse (not shown) located between supply roll 210 of foam layer 200 and counter-rotating drums 620, 622 to heat and soften surface 202 of foam layer 100. Surfaces 102, 202 are disposed together as fiber and foam layers 100, 200 are transported through counter-rotating drums 620, 622 along their respective conveyor paths A, B. Fiber layer 100 and foam layer 200 are compressed through a section of double belt conveyor 634 and the softened surface cooled to fuse the fiber and foam layers 100, 200 together at their surfaces 102, 202 to form bi-layered carpet underlay 500.

Another method of bonding fiber layer 100 and foam layer 200 together to form bi-layered carpet underlay comprises the use of a film having an adhesive applied to both surfaces of the film (not shown). For example, a supply roll of double surface adhesive film could be mounted to traverse 618 and applied to surface 102 of fiber layer 100 as the layer is transported along conveyor path A. Surfaces 102, 202 of fiber and foam layers 100, 200 are disposed together with the double surface adhesive film therebetween, and the layers transported through counter-rotating drums 620, 622 along their respective conveyor paths A, B. Fiber layer 100 and foam layer 200 are compressed through a section of double belt conveyor 634 and the adhesive surfaces of the film bond the layers together at their surfaces 102, 202 to form bi-layered carpet underlay 500.

Figure 2:
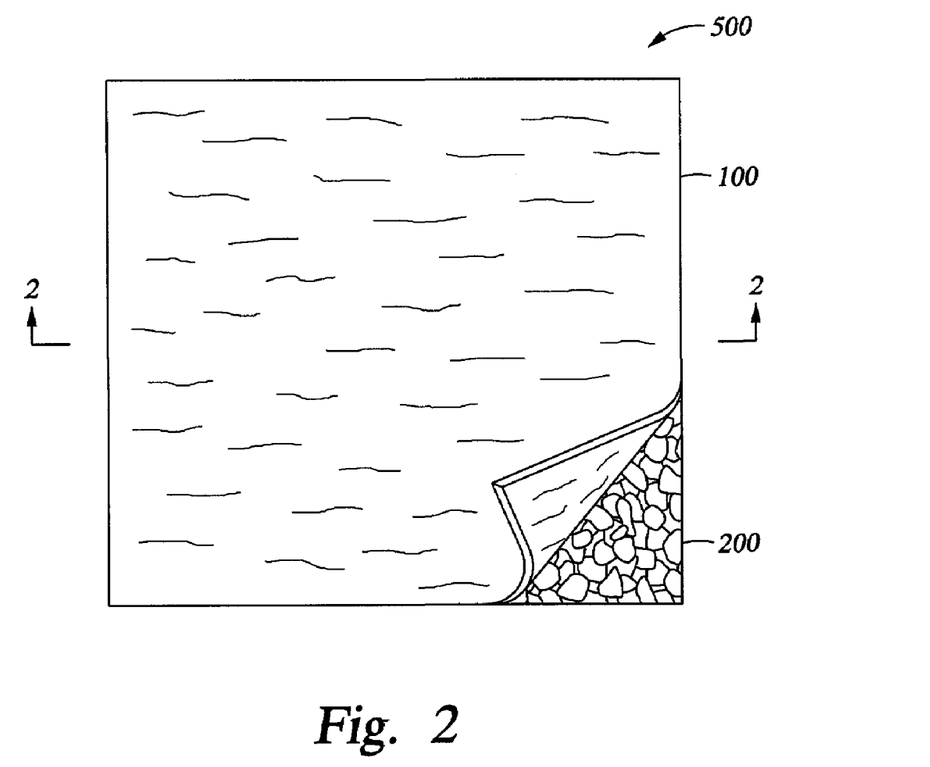
FIG. 2 provides a partial perspective sectional view with layers removed for clarity, of a bi-layered carpet underlay.
Figure 3:
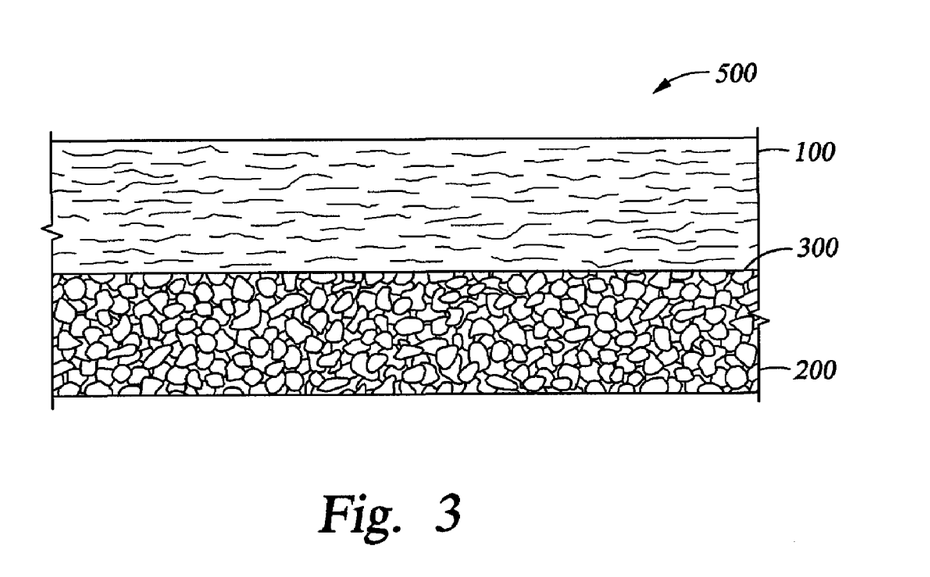
FIG. 3 provides a side view of a bi-layered carpet underlay.

Referring to FIGS. 2 and 3, a bi-layered carpet underlay 500 formed according to the methods of the present invention is illustrated. Carpet underlay 500 is comprised of a non-woven fiber layer 100 and a foam layer 200. Non-woven fiber layer 100 comprises the top layer of carpet underlay 500 which would be proximate the carpet in a flooring system. The bottom layer of carpet underlay 500 is foam layer 200 which is proximate the subfloor in a flooring system. As a result of the configuration, use of a film adhesive to bond non-woven fiber layer 100 and foam layer 200 together in a bi-layered carpet underlay would provide an additional advantage of preventing liquid from migrating from the subfloor to the carpet or from the carpet to the re-bonded foam pad layer, thus protecting the carpet and the re-bonded foam from moisture. Bi-layered carpet underlay 500 combines the soft cushioning resilience of foam with the high durability bridging ability of fiber to provide a carpet underlay that maintains its height or thickness while imparting softness and cushioning effects over an extended period of wear.

The height or thickness of the bi-layered carpet underlay can be of any dimension suitable for the desired application. For example, the thickness of non-woven fiber layer 100 and the thickness of foam layer 200 each can range from about ⅜ inch to about ½ inch to provide carpet underlay 500 having a thickness in the range of about ¾ inch to about 1 inch. The thickness of non-woven fiber layer 100 can be in the range of about ¼ inch to about ⅜ inch and the foam layer thickness can range from about ¼ inch to about ½ inch to provide carpet underlay 500 having a thickness in the range from about ½ inch to about ⅞ inch. The thickness of carpet underlay 500 can also be about ½ inch which can be provided by non-woven fiber layer 100 and foam layer 200 each having a thickness of about ¼ inch. The foregoing is provided as examples only and not as limitations to the present invention.

Fiber layer 100 is comprised of fibers which can be a blend of various types of fibers, including both synthetic and natural fibers. Preferably, the blend is primarily synthetic so that moisture is not absorbed or trapped in the fiber layer as may occur with a blend of primarily natural fibers. Examples of suitable synthetic fibers include thermoplastic polymer fibers such as polyester, nylon and polypropylene and suitable natural carrier fibers include cotton, wool, camel, llama and cashmere. In addition, shoddy material comprising recycled fibers from clothing, bedding, fabric, carpet and other natural and synthetic materials which have been reclaimed are also suitable fibers. Non-woven fiber layer 100 further comprises low melt binder fibers or resin for bonding adjacent fibers together, as discussed in further detail herein. The weight, density and thickness of fiber layer 100 are determined by, among other factors, the process of compressing the batt as it is cooled in thermal bonding applications, or the heating process which cures the resin and fixes the fiber layer 100 in the compressed state in resin bonding applications. The ratio of density to thickness generally dictates whether fiber layer 100 is hi-loft or densified. Preferably, non-woven fiber layer 100 is a densified fiber layer having approximately a 2 to 1 or greater ratio of weight in ounces per square foot to thickness in inches. Accordingly, a densified non-woven fiber layer has a density of approximately 1.5 pounds per cubic foot or more. Fiber layers having less than a 2 to 1 ratio of weight to thickness and less than 1.5 pounds per cubic foot density are defined herein as hi-loft batts and could be used as non-woven fiber layer 100 in certain applications.

Turning to a process for forming fiber layer 100, the bonding processes for the non-woven fibers discussed herein include a thermal bonding process and a resin saturated curing process. However, other methods may be suitable for bonding non-woven fibers together to form a non-woven fiber layer for use in bi-layered carpet underlay 500. For example, needle punching, hydro entangling and mechanical bonds are suitable.

Figure 4A:
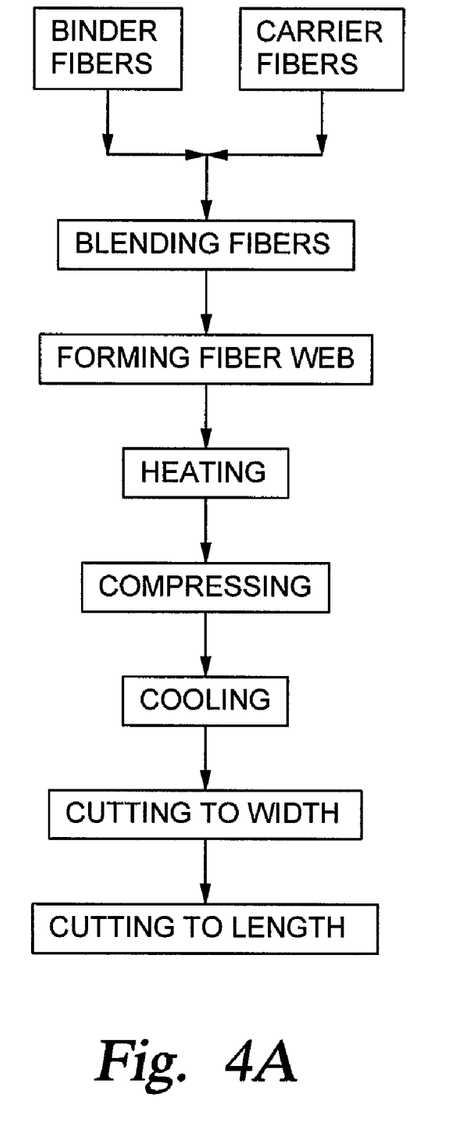
FIG. 4A provides a schematic illustration reflecting a process for producing a fiber layer for a carpet underlay.

The thermal bonding process for the fiber layer is representatively and schematically illustrated in FIG. 4A. The method comprises the step of blending non-woven fibers to form a web blend. The non-woven fibers include carrier fibers and binder fibers. The carrier fibers can be a blend of various types of fibers, including both synthetic and nature. Preferably, the blend is primarily synthetic so that moisture is not absorbed or trapped in the fiber layer of a carpet underlay, as may occur with a combination of primarily natural fibers. Examples of suitable carrier fibers which are natural include cotton, wool, camel, llama and cashmere. Suitable synthetic fibers include thermoplastic polymer fibers such as polyester, nylon and polypropylene. The blend of carrier fibers may include fibers having varying diameters and deniers, and which may be hollow, solid or crimped. Blending of different types of carrier fibers create dead air spaces which contribute to the resiliency of the fiber layer. For example, shoddy material which is generally known in the art could be processed into suitable carrier fibers. Shoddy material can be described as recycled fibers from clothing, bedding, fabric, carpet and other natural and synthetic materials which have been reclaimed. The shoddy material is typically cleaned and shredded into fibers for blending with other fibers. Other suitable carrier fibers can be used depending upon the precise processing limitations imposed and the characteristics of the fiber layer and resulting carpet underlay which are desired, and thus are within the scope of this invention.

The binder fiber for the non-woven fiber layer has a relatively low predetermined melting temperature as compared with the carrier fibers. As used herein, however, the term melting does not necessarily refer only to the actual transformation of the solid polyester binder fibers into liquid form. Rather, it refers to a gradual transformation of the fibers or, in the case of a bicomponent sheath/core fiber, the sheath of the fiber, over a range of temperatures within which the polyester becomes sufficiently soft and tacky to cling to other fibers within which it comes in contact, including other binder fibers having its same characteristics and, as described above, adjacent carrier fibers which have a higher melting temperature. It is an inherent characteristic of thermoplastic fibers such as polyester that they become sticky and tacky when melted, as that term is used herein. For purposes of illustrating the types of suitable binder fibers, and not by way of limitation, the binder fibers can be KoSa Type 254 Celbond® which is a bicomponent fiber with a polyester core and a copolyester sheath. The sheath component melting temperature is approximately 230° F. (110° C.). The binder fibers, alternatively, can be a polyester copolymer rather than a bicomponent fiber.

While the homogeneous blend of non-woven carrier and binder fibers can be any of a number of suitable fiber blends, for purposes of illustration, the mixture is comprised of binder fibers in an amount sufficient for binding the fibers of the blend together upon application of heat at a temperature suitable to melt the binder fibers but not the carrier fibers. In one example, the binder fibers are in the range of approximately 5 percent to 50 percent by total volume of the blend. In another example, the binder fibers are present in the range of approximately 15 percent to 40 percent for a densified fiber layer, as that characteristic is discussed herein. Blends having other percentages of binder and carrier fibers are also within the scope of the invention.

Figure 5:
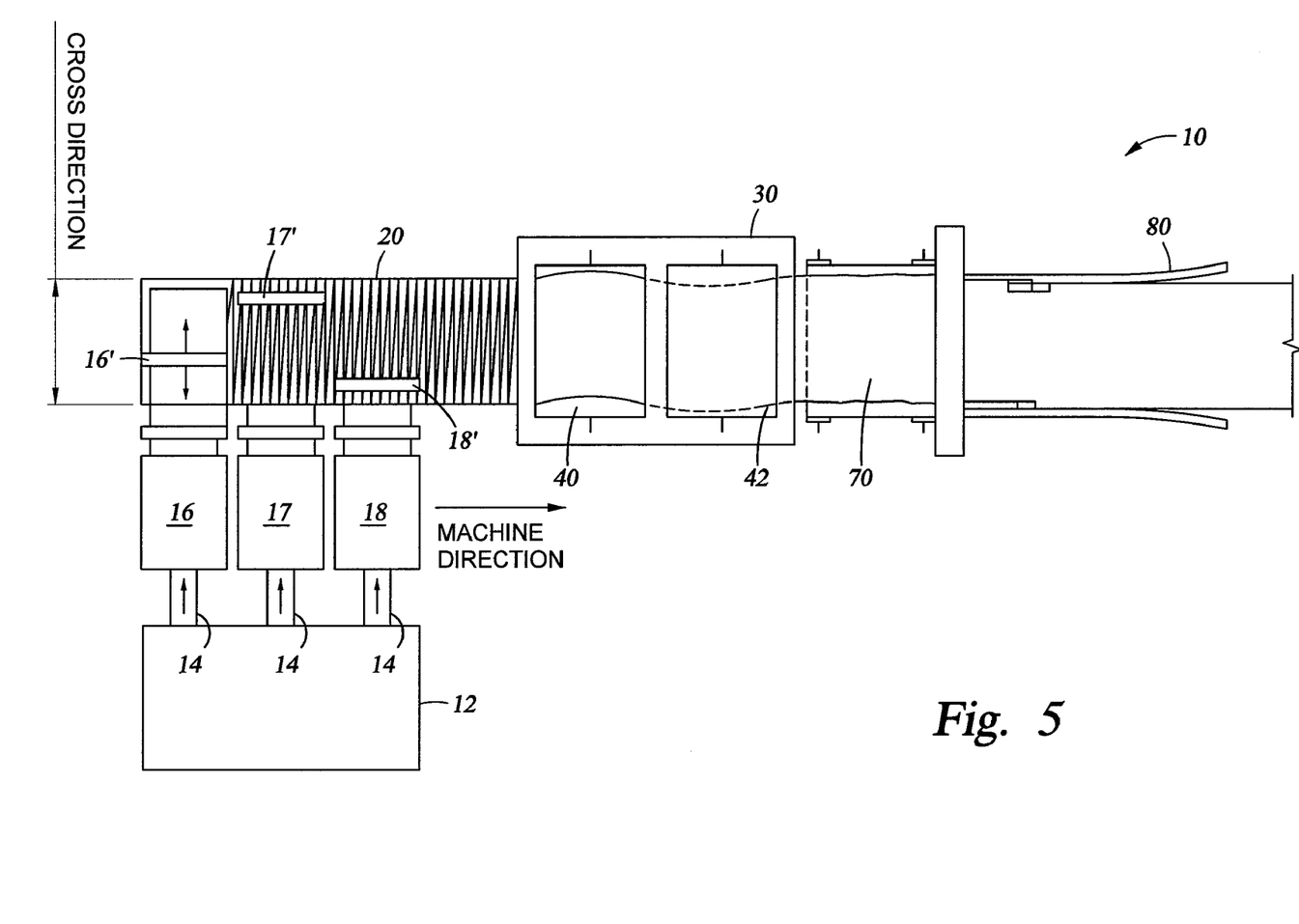
FIG. 5 provides a schematic top plan view of the processing line for forming a fiber layer for a carpet underlay.

Referring to FIG. 5, a schematic top plan view of the general processing line 10 for forming a fiber layer of the present invention is illustrated. As discussed above, fibers are blended in a fiber blender 12 and conveyed by conveyor pipes 14 to a web forming machine or, in this example, three machines 16, 17, 18. A suitable web forming apparatus is a garnett machine. An air laying machine, known in the trade as a Rando webber, or any other apparatus for forming a web structure is suitable. Garnett machines 16, 17, 18 card the blended fibers into a non-woven web having a desired width and deliver the web to cross-lappers 16', 17', 18' to cross-lap the web onto a slat conveyor 20 which is moving in the machine direction. Cross-lappers 16', 17' 18' reciprocate back and forth in the cross direction from one side of conveyor 20 to the other side to form the web having multiple thicknesses in a progressive overlapping relationship. The number of layers which make up the web is determined by the speed of the conveyor 20 in relation to the speed at which successive layers of the web are layered on top of each other and the number of cross-lappers 16', 17', 18'. Thus, the number of single layers which make up the web can be increased by slowing the relative speed of the conveyor 20 in relation to the speed at which cross layers are layered, by increasing the number of cross-lappers 16', 17' 18' or both. Conversely, a fewer number of single layers can be achieved by increasing the relative speed of conveyor 20 to the speed of laying the cross layers, by decreasing the number of cross-lappers 16', 17', 18' or both.

Referring back to FIG. 4A, the fiber web formed from the blend of carrier and binder fibers are heated to bond the fibers together. While there are a variety of thermal bonding methods which are suitable, one such method comprises holding the fiber web by vacuum pressure applied through perforations of first and second counter-rotating drums and heating the fiber web so that the relatively low melting temperature binder fibers soften or melt to the extent necessary to fuse adjacent low melt binder fibers together and to adjacent carrier fibers. Alternatively, the fiber web can move through an oven by substantially parallel perforated or mesh wire aprons to melt the low temperature binder fibers.

Figure 6A:
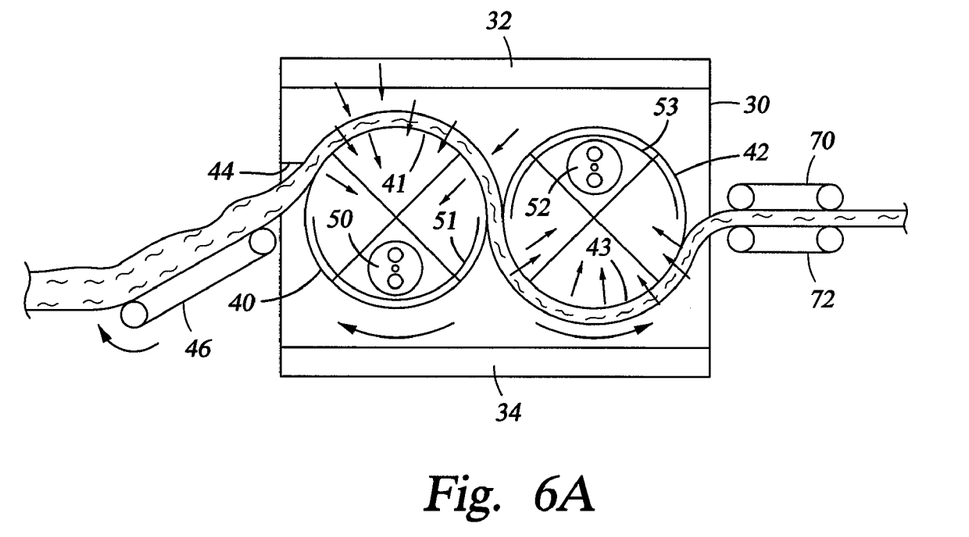
FIG. 6A provides a schematic side view of a thermal bonding apparatus for a fiber layer for a carpet underlay.

Referring to FIGS. 5 and 6A, the vacuum pressure method generally comprises using counter-rotating drums 40, 42 having perforations 41, 43, respectively, which are positioned in a central portion of a housing 30. Housing 30 also comprises an air circulation chamber 32 and a furnace 34 in an upper portion and a lower portion, respectively, thereof. Drum 40 is positioned adjacent an inlet 44 though which the fiber web is fed. The fiber web is delivered from the blending and web forming processes described herein by means of an infeed apron 46. A suction fan 50 is positioned in communication with the interior of drum 40. The lower portion of the circumference of drum 40 is shielded by a baffle 51 positioned inside drum 40 so that the suction-creating air flow is forced to enter drum 40 through perforations 41 which are proximate the upper portion of drum 40 as it rotates.

Drum 42 is downstream from drum 40 in housing 30. Drums 40, 42 can be mounted for lateral sliding movement relative to one another to facilitate adjustment for a wide range of fiber web thicknesses (not shown). Drum 42 includes a suction fan 52 which is positioned in communication with the interior of drum 42. The upper portion of the circumference of drum 42 is shielded by a baffle 53 positioned inside drum 42 so that the suction-creating air flow is forced to enter drum 42 through perforations 43 which are proximate the lower portion of drum 42 as it rotates.

The batt fiber web is held in vacuum pressure as it moves from the upper portion of rotating drum 40 to the lower portion of counter rotating drum 42. Furnace 34 heats the air in housing 30 as it flows from perforations 41, 43 to the interior of drums 40, 42, respectively, to soften or melt the relatively low melting temperature binder fibers to the extent necessary to fuse adjacent low melt binder fibers together and to adjacent carrier fibers.

Figure 6B:
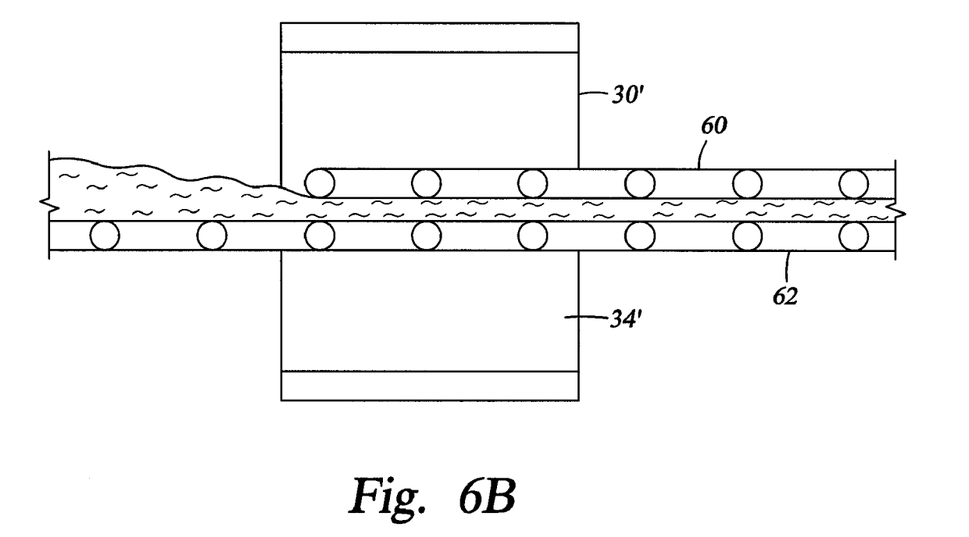
FIG. 6B provides a schematic side view of another thermal bonding apparatus for a fiber layer for a carpet underlay.

Referring to FIG. 6B, in an alternative thermal bonding process, the batt enters housing 30' by a pair of substantially parallel perforated or mesh wire aprons 60, 62. Housing 30' comprises an oven 34' which heats the batt to soften or melt the relatively low melting temperature binder fibers in the first and second webs to the extent necessary to fuse adjacent low melt binder fibers together and to adjacent carrier fibers.

Referring to FIGS. 5, 6A and 6B, the fiber layer is compressed and cooled as it exits from housing 30, 30' by a pair of substantially parallel first and second perforated or wire mesh aprons 70, 72. Aprons 70, 72 are mounted for parallel movement relative to each other to facilitate adjustment for a wide range of layer thicknesses (not shown). The fiber layer can be cooled slowly through exposure to ambient temperature air or, alternatively, ambient temperature air can forced through the perforations of one apron, through the fiber layer and through the perforations of the other apron to cool the fiber layer and set it in its compressed state. The fiber layer is maintained in its compressed form upon cooling since the solidification of the low melt temperature binder fibers in their compressed state bonds the fibers together in that state.

Referring to FIGS. 5A and 5, the cooled fiber layer moves into cutting zone 80 where its lateral edges are trimmed to a finished width and where it is rolled and cut transversely to the desired length of fiber layer.

Figure 4B:
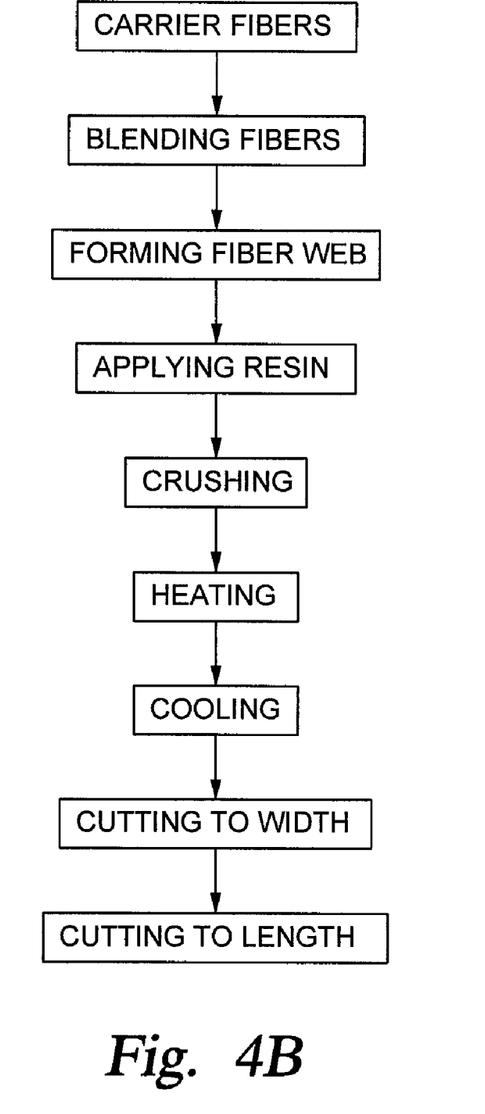
FIG. 4B provides a schematic illustration reflecting another process for producing a fiber layer for a carpet underlay.

Referring to FIG. 4B, the method for bonding the non-woven fibers of the fiber layer comprising a resin bonding process is representatively and schematically illustrated. Non-woven carrier fibers are blended to form a fiber web. The carrier fibers can be the same as or similar to those blended with the binder fibers in the thermal bonding process for a fiber layer. Low melt binder fibers are not required, as a heat curable binder material is used in the resin bonding process. Forming the fiber web of the resin bonding method is generally similar to that for the thermal bonding process detailed above. An air laying machine can also be used. In an air laying application, generally the carrier fibers are introduced into an air stream which carries the fibers to an air permeable support such as a perforated drum which is rotating. Accumulation of the fibers onto the drum surface results in a web formation. A vacuum is applied through the web from one side of the web to the other and through said air permeable support sufficient to reduce the thickness and increase the density of the web throughout the thickness of the web to form a fiber layer.

Heat curable resin is applied to the fiber layer for bonding adjacent fibers together. While there are a variety of applications, generally resin in the form of liquid is sprayed while froth resin is extruded onto the fiber layer. Alternatively, the fiber layer is fed or dipped into a bath of resin. Resins suitable for the present invention are curable by heat and can be any of a variety of compositions. Generally, the resin is comprised of latex or acrylic binders. In the application of liquid resin, as the fiber layer moves along a conveyor in the machine direction, the resin is sprayed onto the fiber layer from one or more spray heads which move in a transverse or cross direction to substantially coat the fiber layer. Froth resin is extruded onto the fiber layer using a knife or other means. The fiber layer could also be fed through or dipped into a resin bath. The applied resin is crushed into the fiber layer for saturation therethrough by nip rollers which are disposed along the transverse direction of the conveyor to apply pressure to the surface of the fiber layer. Alternatively, the resin is crushed into the fiber layer by vacuum pressure applied through the fiber layer. The fiber layer moves into an oven heated to a temperature which cures the resin. The fiber layer exits the oven and is cooled. The dimensions of the fiber layer are maintained substantially in their oven state upon cooling since the heat cures the resin which bonds the fibers of the fiber layer together in this state. The fiber layer moves into a cutting zone where its lateral edges are trimmed to a finished width and it is rolled and cut transversely to the desired length.

Turning now to foam layer 200 of bi-layered carpet underlay 500, foam layer 200 is comprised of recycled foam particles. Suitable foam materials includes ether foams which can be found in furniture cushions and mattresses, ester foams which can be found in consumer product packaging and displays and in garment shoulder pads, quilting materials found in mattress trims, foams found in automobile headliners and door panels and foams found in traditional residential foam carpet underlay. Other foam materials may be suitable for the present invention. Various foam materials are shredded into particles and are blended into a homogeneous mixture. A binder is mixed into the homogenous blend. Suitable binders include polyurethane binders which comprise a polyurethane resin and a mixture of solid materials of varying densities and compositions. The polyurethane resin is composed of polyol, an organic substance containing three or more hydroxyl groups; polymeric diphenylmethane diisocyanate; and process oil, an organic liquid added to the prepolymer to lower its viscosity and serve as a solvent. Other binders may be suitable for the blend as is understood by one skilled in the art. The blend of foam particles and binder moves to a compression chamber where the blend is compressed and extruded into a block or blown into a cylindrical log mold. Steam is applied to the compressed block or log and the water and heat initiate a chemical reaction of the binder. The compressed block or log is allowed to dry and the resin allowed to cure. The compressed block or log is then sliced along its height to create foam layers having thicknesses corresponding to the sliced heights.

A bi-layered carpet underlay according to the present invention was tested using the Phillips Chair Test which is a test used in the commercial market to replicate the wear of carpet and an underlying carpet underlay. A bi-layered carpet underlay of the present invention was installed over a concrete subfloor and a 4 foot by 4 foot piece of carpet was installed over the underlay. A 150 pound container was placed on the carpet and moved over the top of the carpet for a series of 20,000 cycles. As 10,000 cycles represents approximately one year of heavy commercial traffic, the carpet underlay was representatively tested for a two year period. After completion of the test, the carpet underlay was removed and inspected. The test results showed no apparent lose of height, thickness, gauge or density of the bi-layered carpet underlay and the underlay retained its softness and cushion. In addition, the foam and fiber layers of the carpet underlay did not delaminate.

While preferred embodiments have been shown and described, various modifications and substitutions may be made thereto without departing from the spirit and scope of the invention. Those skilled in the art will readily see other embodiments within the scope of the invention. Accordingly it is to be understood that the method for forming bi-layered fiber and foam carpet underlay and the bi-layered carpet underlay of the present invention has been described by way of illustration only and not limitation.

What is claimed is:

1. A bi-layered carpet underlay comprising:
   a cured layer of re-bonded foam particles, having a thickness suitable for providing soft cushioning resilience and a surface; and
   a thermal bonded non-woven fiber batt, having a thickness suitable for providing durable cushioning support and a surface;
   wherein:
   said layer of re-bonded foam particles and said non-woven fiber batt each are at least about ¼ inch thick;
   said non-woven fiber batt comprises a homogeneous blend of carrier and binder fibers, said binder fibers comprising between about five percent by volume and about fifty percent by volume of said homogeneous blend; and
   said surface of said nonwoven fiber batt is disposed against and bonded to said surface of said cured layer of re-bonded foam.

2. A bi-layered carpet underlay as in claim 1 wherein said non-woven fiber batt comprises synthetic fibers.

3. A bi-layered carpet underlay as in claim 2 wherein said synthetic fiber is selected from the group consisting of polyester, nylon and polypropylene fibers.

4. A bi-layered carpet underlay as in claim 1 further comprising a heat activated adhesive, wherein said adhesive is applied to said surface of said non-woven fiber batt or said surface of said cured layer of re-bonded foam particles and bonds said non-woven fiber batt to said cured layer of re-bonded foam particles.

5. A bi-layered carpet underlay as in claim 1 further comprising a film having first and second surfaces and an adhesive on both of said surfaces of said film, wherein said film is disposed between said non-woven fiber batt and said cured layer of re-bonded foam particles.

6. A bi-layered carpet underlay as in claim 1 wherein said non-woven fiber batt has sufficient thickness so that the bi-layered carpet underlay durably maintains roughly its original height.

7. A bi-layered carpet underlay as in claim 6 wherein said non-woven fiber batt and said layer of re-bonded foam particles are approximately the same thickness.

8. A bi-layered carpet underlay as in claim 6 wherein said non-woven fiber batt has a density of at least 1.5 pounds per cubic foot.

9. A bi-layered carpet underlay as in claim 1 wherein said non-woven fiber batt has a ratio of ounces per square foot to thickness in inches of less than about 2:1 and a density of less than about 1.5 pounds per cubic foot.

10. A bi-layered carpet underlay as in claim 1 wherein said carrier fibers are shoddy material containing recycled fibers from both natural and synthetic materials.

11. A bi-layered carpet underlay as in claim 1 wherein said carrier fibers comprise hollow, solid and crimped carrier fibers of varying diameters and deniers.

12. A bi-layered carpet underlay as in claim 1 wherein said cured layer of re-bonded foam particles is selected from the group consisting of recycled ether foams, ester foams, mattress quilting material foams, automobile headliner and door panel foams, and carpet underlay foams.

13. A bi-layered carpet underlay as in claim 1 wherein said carrier fiber is one or more natural fiber selected from the group consisting of cotton, wool, camel, llama and cashmere fibers.

14. A bi-layered carpet underlay as in claim 1 wherein said non-woven fiber batt has a thickness in a range which extends from about ¼ inch to about ½ inch, and said cured layer of re-bonded particles has a thickness in a range which extends from about ¼ inch to about ½ inch.

15. A bi-layered carpet underlay as in claim 1 wherein said cured layer of re-bonded foam particles comprises shredded recycled foam.

16. A bi-layered carpet underlay as in claim 1 wherein said non-woven fiber batt comprises between about 15% and about 40% by volume of binder fibers.

* * * * *